Dec. 5, 1933.  H. L. FLATHER ET AL  1,937,949
MEANS FOR LUBRICATING TOOL HOLDING RESTS FOR MACHINE TOOLS
Filed Oct. 20, 1932  2 Sheets-Sheet 1
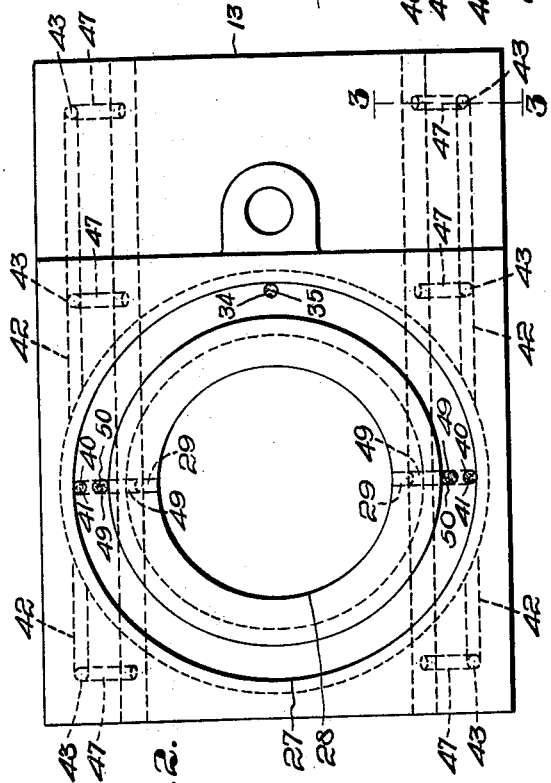
Inventors:
Herbert L. Flather.
Joseph H. Flather,
by Emery, Booth, Varney, Tinnand Attys.

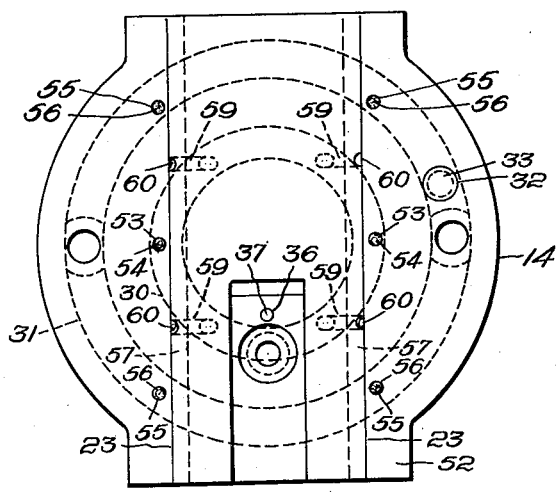
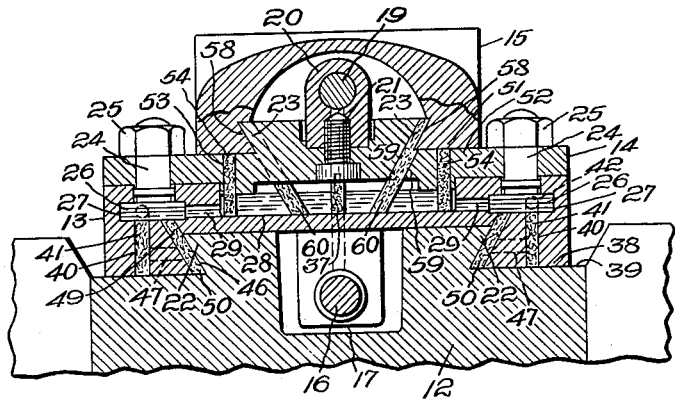

Patented Dec. 5, 1933

1,937,949

UNITED STATES PATENT OFFICE 1,937,949

MEANS FOR LUBRICATING TOOL-HOLDING RESTS FOR MACHINE TOOLS

Herbert L. Flather and Joseph H. Flather, Nashua, N. H.; Joseph H. Flather and Herbert H. Flather, administrators of said Herbert L. Flather, deceased Application October 20, 1932. Serial No. 638,744

15 Claims. (Cl. 82—24)

This invention relates to means for lubricating working parts of tool-holding rests of machine tools, and aims to provide a tool-holding rest with self-contained means, whereby each part needing lubrication is provided with the same, automatically in the proper quantity, only when such part is moved, without excess lubrication, and without attention on the part of the operator other than to keep the reservoir supplied.

The invention will best be understood by reference to the following description, when taken in connection with the accompanying drawings of one specific embodiment thereof, while its scope will be pointed out more particularly in the appended claims.

In the drawings:

Fig. 1 is a vertical, cross-sectional view of a portion of a lathe having a compound rest provided with lubricating means embodying the invention;

Fig. 2 is a plan of the transversely movable base which slides upon the carriage;

Fig. 3 is a sectional view on line 3—3 of Fig. 2;

Fig. 4 is a plan of the swivel which rests upon the base and turns about a vertical axis, and in turn supports the top block to which the usual tool post (not shown) is secured; and Fig. 5 is a vertical, sectional view, partly in each of two planes indicated by the lines 5 and 5a.

Referring to the drawings, and to the embodiment of the invention illustrated therein, there is shown a portion of a lathe comprising a bed 10 provided with ways 11, which guide a carriage 12 lengthwise of the bed, said carriage in turn supporting a transversely-slidable base 13. The base supports a swivel 14, which turns about a vertical axis, and the swivel in turn supports a top block 15, the latter being mounted to slide thereon. The base is movable transversely of the carriage by a cross-feed screw 16 and nut 17, the latter being in the nature of a stud having a shank threaded to receive a nut 18, which secures the cross-feed nut to the base. The top block is similarly movable to and fro by a screw 19 and nut 20, the latter being secured to the swivel by a screw 21. The base is guided by dove-tail ways 22 (see Fig. 5), presented by the carriage, and the top block is similarly guided by dove-tail ways 23 presented by the swivel. The swivel is adjustably clamped upon the base by T-bolts 24 provided with nuts 25, and having heads 26 received in an annular groove 27 of corresponding formation in the base. By loosening these nuts, the swivel may be turned to the desired position, and then clamped in place.

Thus far, the mechanism is of common and well-known form. The base and the swivel, however, depart from former practices, in that the base is provided with a central reservoir 28 (see Fig. 1), which communicates by way of horizontal passages 29 (see Fig. 5) with the annular groove 27, which thus constitutes a second, outer reservoir whose capacity is approximately the same as that of the central reservoir. By thus connecting the reservoirs, both may be filled from one opening hereinafter described. The swivel 14 constitutes a cover for both reservoirs, and the swivel is provided with two downwardly-directed, annular flanges 30 and 31, one received in the central reservoir 28 and having a working fit therein, and the other being received in the upper portion of the annular groove 27 and having a working fit therein. Thus, the swivel is guided for rotation about a vertical axis. Oil may be supplied to the reservoirs from time to time through a filling opening 32 (see Fig. 4), having a removable plug 33 therein. The reservoirs supply oil, through means now to be described, to the various working parts requiring lubrication.

A conduit 34, partly in the base 13 and partly in the cross-feed nut 17, leads from the annular portion of the reservoir to the engaging surfaces of the cross-feed screw and the nut, and, as shown, this conduit contains a wick 35 of felt or other suitable material, which feeds oil to said surfaces by capillary action, only when the parts are moved, and thus without excess lubrication. The screw 19 and nut 20 are supplied in a similar fashion by a conduit 36, partly in the swivel and partly in the nut, and containing a wick 37, the latter leading from the central portion of the reservoir. Referring to Fig. 5, lubrication of horizontal bearing surfaces 38 of the base 13 and 39 of the carriage 12 is conveniently accomplished by providing the base with vertical passages 40, leading downwardly from the annular reservoir 27 and containing wicks 41. Additional lubrication for these surfaces may be, and herein is, had by providing the base with two horizontal passages 42 (see Fig. 2) leading from the annular reservoir 27, and communicating with a plurality of vertical passages 43, each of the latter containing a wick 44 (see Fig. 3).

Lubrication of oblique bearing surfaces 45 of the base 13 (see Fig. 3) and 46 of the carriage 12 (see Fig. 5) is conveniently accomplished by providing the base with a plurality of horizontal passages 47 leading from the passages 43, respectively (see Figs. 2 and 3), and each containing a wick 48 (see Fig. 3). Additional lubrication of these surfaces may be, and herein is, furnished by providing the base with oblique passages 49, leading downwardly from the annular reservoir 27, and each containing a wick 50.

Referring again to Figs. 4 and 5, lubrication of horizontal bearing surfaces 51 of the block 15, and 52 of the swivel 14, is afforded by providing the swivel with vertical passages 53 leading upwardly from the central reservoir 28, and containing wicks 54. Additional lubrication for these surfaces may be, and herein is, furnished by providing the swivel with vertical passages 55 (see Fig. 4), containing wicks 56. Lubrication of oblique surfaces 57 of the swivel 14, and 58 of the block 15, is had by providing the swivel with oblique passages 59 leading upwardly from the central reservoir 28, and containing wicks 60.

From the foregoing description, it is evident that the many wicks feed oil from the reservoirs by capillary action to the various bearing surfaces, only when movement of the bearing surfaces takes place, and thus without excess lubrication, and without waste of oil. No attention on the part of the operator is required, except an occasional filling of the reservoirs by removal of the filling plug 33.

Having thus described one embodiment of the invention, but without limiting ourselves thereto, what we claim and desire by Letters Patent to secure is:

1. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, said base presenting an oil reservoir, and means for feeding oil from said reservoir to bearing surfaces of said parts.

2. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, said base presenting an oil reservoir and said swivel presenting a cover for said reservoir, and means for feeding oil from said reservoir to bearing surfaces of said parts.

3. In a machine tool, the combination of a support, a base mounted to slide upon said support, a screw and nut for sliding said base upon said support, a swivel mounted on said base to turn about an axis, a top-block mounted to slide upon said swivel a screw and nut for sliding said top-block on said swivel, said base presenting an oil reservoir and said swivel presenting a cover for said reservoir and a filling opening therefor, and means for feeding oil from said reservoir to bearing surfaces of said parts.

4. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, one of said parts having an oil reservoir formed therein, and means for feeding oil from said reservoir to bearing surfaces of said parts.

5. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, one of said parts having an oil reservoir formed therein, and means including wicks for feeding oil from said reservoir to bearing surfaces of said parts.

6. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, one of said parts having an oil reservoir formed therein and another of said parts constituting a cover for said reservoir, and means for feeding oil from said reservoir to bearing surfaces of said parts.

7. In a machine tool, the combination of a base, a swivel mounted upon said base to turn about an axis, a top-block mounted to slide upon said swivel, a screw and nut for sliding said top-block on said swivel, said base presenting an oil reservoir, and means for feeding oil from said reservoir to said screw and nut.

8. In a machine tool, the combination of a base, a swivel mounted upon said base to turn about an axis, a top-block mounted to slide upon said swivel, a screw and nut for sliding said top-block on said swivel, said base presenting an oil reservoir, and means for feeding oil from said reservoir to said screw and nut, said means including a conduit in said swivel and in said nut.

9. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, said base presenting an oil reservoir, means for feeding oil from said reservoir to the first-mentioned screw and nut, and means for feeding oil from said reservoir to the second-mentioned screw and nut.

10. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, said base presenting an oil reservoir, and means for feeding oil from said reservoir to the engaging surfaces of said support and said base.

11. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, said base presenting an oil reservoir, and means for feeding oil from said reservoir to the engaging surfaces of said swivel and said block.

12. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, said base presenting an oil reservoir, means for feeding oil from said reservoir to the first-mentioned screw and nut, means for feeding oil from said reservoir to the second-mentioned screw and nut, means for feeding oil from said reservoir to the engaging surfaces of said support and said base, and means for feeding oil from said reservoir to the engaging surfaces of said swivel and said block.

13. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, said base presenting inner and outer oil reservoirs, means for feeding oil from said outer reservoir to the first-mentioned screw and nut, means for feeding oil from said inner reservoir to the second-mentioned screw and nut, means for feeding oil from said outer reservoir to the engaging surfaces of said support and base, and means for feeding oil from said inner reservoir to the engaging surfaces of said swivel and said block.

14. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, said base presenting inner and outer oil reservoirs, means for feeding oil from said outer reservoir to the first-mentioned screw and nut, and means for feeding oil from said inner reservoir to the second-mentioned screw and nut.

15. In a machine tool, the combination of a support, a base mounted to slide upon said support, a screw and nut for sliding said base upon said support, a swivel mounted on said base to turn about an axis, a top-block mounted to slide upon said swivel, a screw and nut for sliding said top-block on said swivel, said base presenting inner and outer oil reservoirs, means for feeding oil from said outer reservoir to the engaging surfaces of said support and base, and means for feeding oil from said inner reservoir to the engaging surfaces of said swivel and said block.

HERBERT L. FLATHER.
JOSEPH H. FLATHER.